(12) United States Patent
Back et al.

(10) Patent No.: US 9,153,981 B2
(45) Date of Patent: Oct. 6, 2015

(54) ELECTRIC POWER SUPPLY ADAPTER DEVICE FOR ELECTRIC GOLF CARS AND ELECTRIC UTILITY VEHICLES

(75) Inventors: Tyler Jon Back, San Francisco, CA (US); Trevor Jason Back, Indianapolis, IN (US)

(73) Assignees: Tyler Jon Back, San Francisco, CA (US); Trevor Jason Back, Indianapolis, IN (US)

( * ) Notice: Subject to any disclaimer, the term of this patent is extended or adjusted under 35 U.S.C. 154(b) by 389 days.

(21) Appl. No.: 13/607,018

(22) Filed: Sep. 7, 2012

(65) Prior Publication Data

US 2013/0234646 A1 Sep. 12, 2013

Related U.S. Application Data

(60) Provisional application No. 61/532,552, filed on Sep. 9, 2011.

(51) Int. Cl.
| | |
|---|---|
| *H02J 7/00* | (2006.01) |
| *H01R 13/66* | (2006.01) |
| *H01R 31/06* | (2006.01) |
| *B60L 11/18* | (2006.01) |
| *H01R 24/68* | (2011.01) |

(52) U.S. Cl.
CPC .......... *H02J 7/0042* (2013.01); *H01R 13/6675* (2013.01); *H01R 31/065* (2013.01); *B60L 11/1818* (2013.01); *H01R 24/68* (2013.01); *Y02T 90/14* (2013.01)

(58) Field of Classification Search
CPC ... Y02T 10/7088; Y02T 90/14; Y02T 90/127; Y02T 10/7216; Y02T 10/7225; Y02T 10/7233; Y02T 10/6269; B60L 11/1818; B60L 2210/10; B60L 11/1811; B60L 11/1842; B60L 2200/22; H02J 7/0042; H01R 13/6675; H01R 24/68; H01R 31/065
See application file for complete search history.

(56) References Cited

U.S. PATENT DOCUMENTS

| | | | | |
|---|---|---|---|---|
| 5,646,507 | A * | 7/1997 | Timmons et al. | 320/149 |
| 6,057,610 | A * | 5/2000 | Nierescher | 307/72 |
| 6,559,556 | B1 * | 5/2003 | Wills | 307/10.1 |
| 6,842,356 | B2 * | 1/2005 | Hsu | 363/146 |
| 6,956,353 | B1 * | 10/2005 | Klitzner | 320/107 |
| 7,377,805 | B2 * | 5/2008 | Kim et al. | 439/502 |
| 7,435,141 | B2 * | 10/2008 | Tan et al. | 439/638 |
| 8,005,586 | B2 * | 8/2011 | Miki et al. | 701/22 |
| 9,024,573 | B2 * | 5/2015 | King et al. | 320/107 |
| 2007/0139010 | A1 * | 6/2007 | Bonneau et al. | 320/125 |
| 2009/0026837 | A1 * | 1/2009 | Lee | 307/10.1 |
| 2009/0167241 | A1 * | 7/2009 | Lee et al. | 320/111 |
| 2009/0309542 | A1 * | 12/2009 | Hung et al. | 320/111 |
| 2010/0320959 | A1 * | 12/2010 | Tomberlin et al. | 320/101 |
| 2015/0115709 | A1 * | 4/2015 | King et al. | 307/10.1 |

* cited by examiner

*Primary Examiner* — Michael Zarroli

(57) ABSTRACT

An electric power supply adapter device that plugs into a charging receptacle of an electric golf car or electric utility vehicle used to power an electronic apparatus. The main components consist of input electric connectors positioned in the housing and adapted to fit a charging receptacle of an electric golf car or electric utility vehicle, a DC converter module to convert input power from the charging receptacle of an electric golf car or electric utility vehicle into the required DC output power, and an output electric connector adapted to receive an electronic apparatus and to transmit the DC output power from the DC converter module to the electronic apparatus.

15 Claims, 6 Drawing Sheets

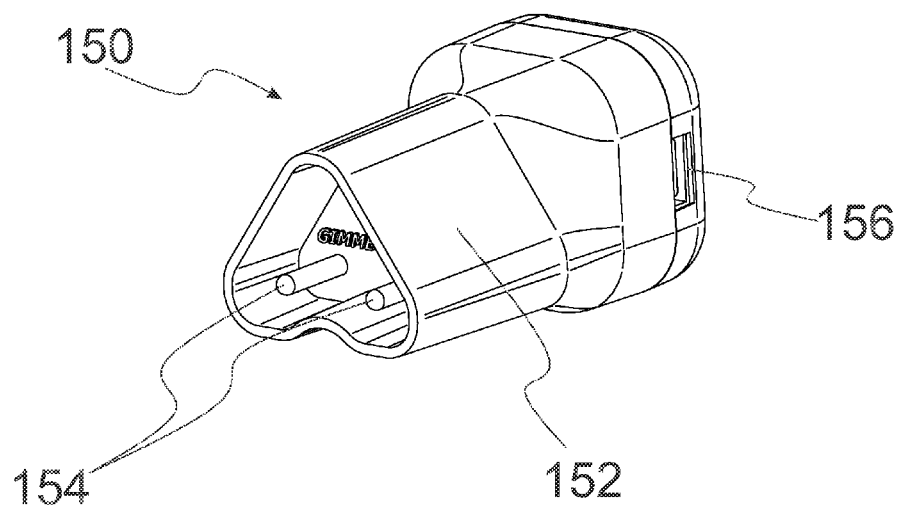
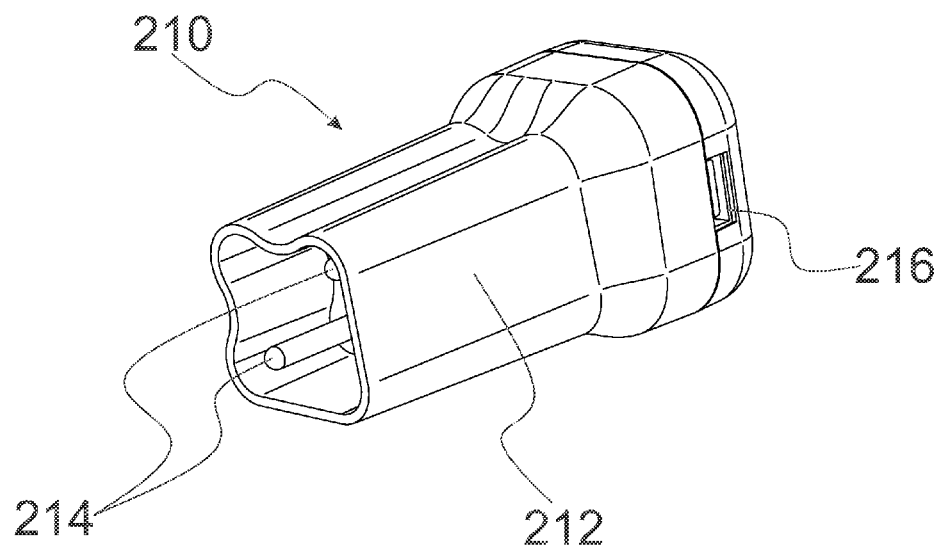

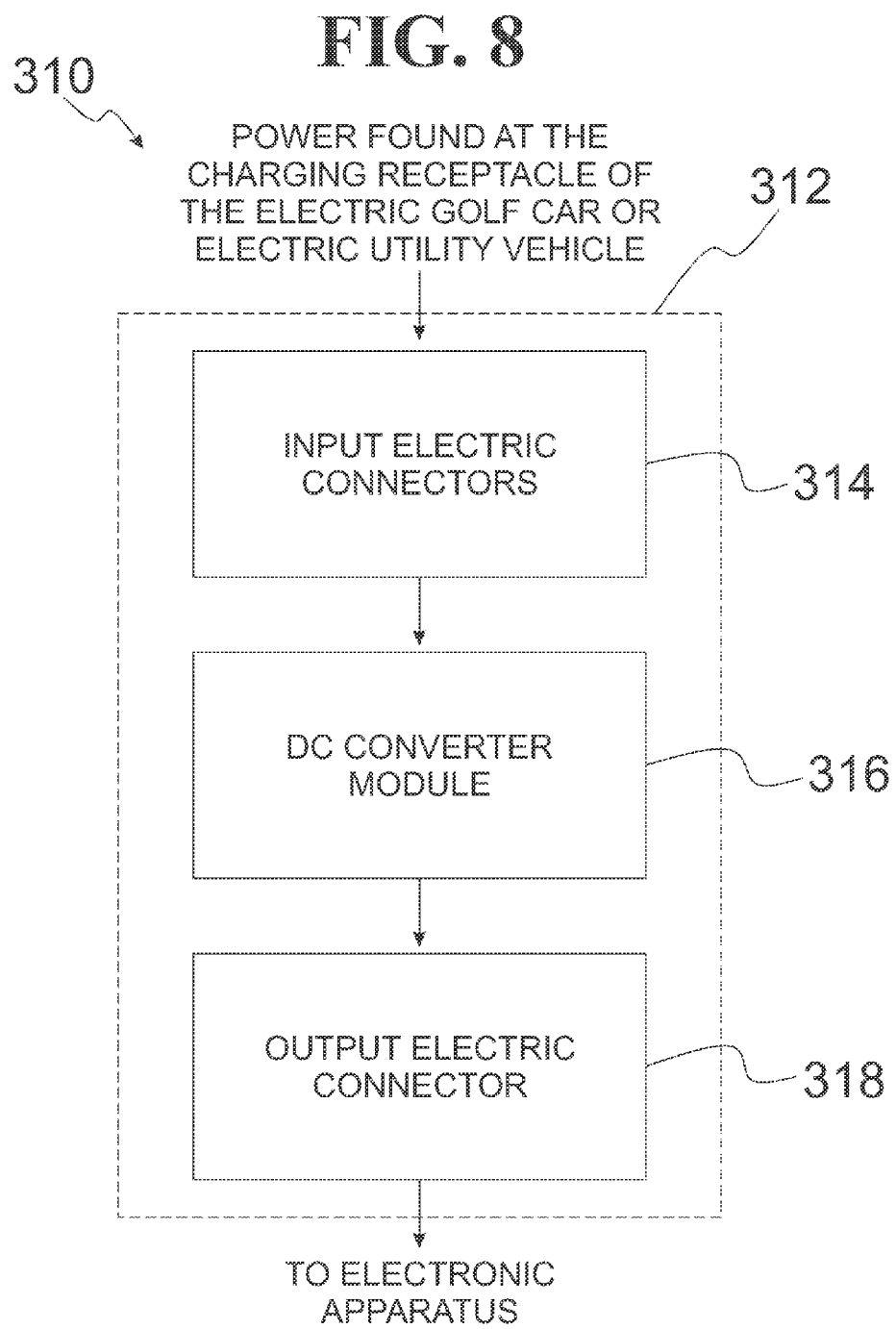

ELECTRIC POWER SUPPLY ADAPTER DEVICE FOR ELECTRIC GOLF CARS AND ELECTRIC UTILITY VEHICLES

CROSS-REFERENCE TO RELATED APPLICATIONS

This application claims priority to U.S. Provisional Patent Application 61/532,552, filed, Sep. 9, 2011 which is incorporated by reference herein.

REVERENCES CITED

Jun. 7, 2012, Holland, US 2012/0139335

BACKGROUND OF THE INVENTION

Field of the Invention

The present invention is in the technical field of power supplies. More particularly, the present invention is in the technical field of adapting electric power from a power source that has relatively high voltage for use in charging an electronic apparatus that cannot use such voltage directly, but requires lower voltage and a specific current.

With the rising number of electronic apparatuses being used daily and their increased capabilities and therefore increased power demands, there are several adapters available for sourcing power to charge the batteries within an electronic apparatus over the course of a day. Unfortunately, for people in electric utility vehicles, such as golf cars, there is not yet such an adapter for tapping into the power supply of electric utility vehicles through the vehicle's conveniently located charging receptacle.

There is a growing number of golf applications for smart phones. For example GPS (global positioning system) applications are available to help players navigate golf courses. Although the applications are very popular, many golfers are disappointed that their smart phones run out of power before they come to the end of their game at the golf course.

There are many other electric utility vehicles for which such a power adapter would be useful. Examples include vehicles used by meter maids, by airport personnel, by farmers, by disabled persons, and by event personnel.

What is needed is a simple adapter to source the power found at the charging receptacle in an electric utility vehicle for use in charging electronic apparatuses.

BRIEF DESCRIPTION OF THE DRAWINGS

The foregoing aspects and others will be readily appreciated by the skilled artisan from the following description of illustrative embodiments when read in conjunction with the accompanying drawings.

FIG. 5 is a perspective view of an electric power supply adapter device of the present invention;

FIG. 6 is a perspective view of an electric power supply adapter device of the present invention;

FIG. 8 is a circuit block diagram of an electric power supply adapter device of the present invention.

SUMMARY

Figure 1:
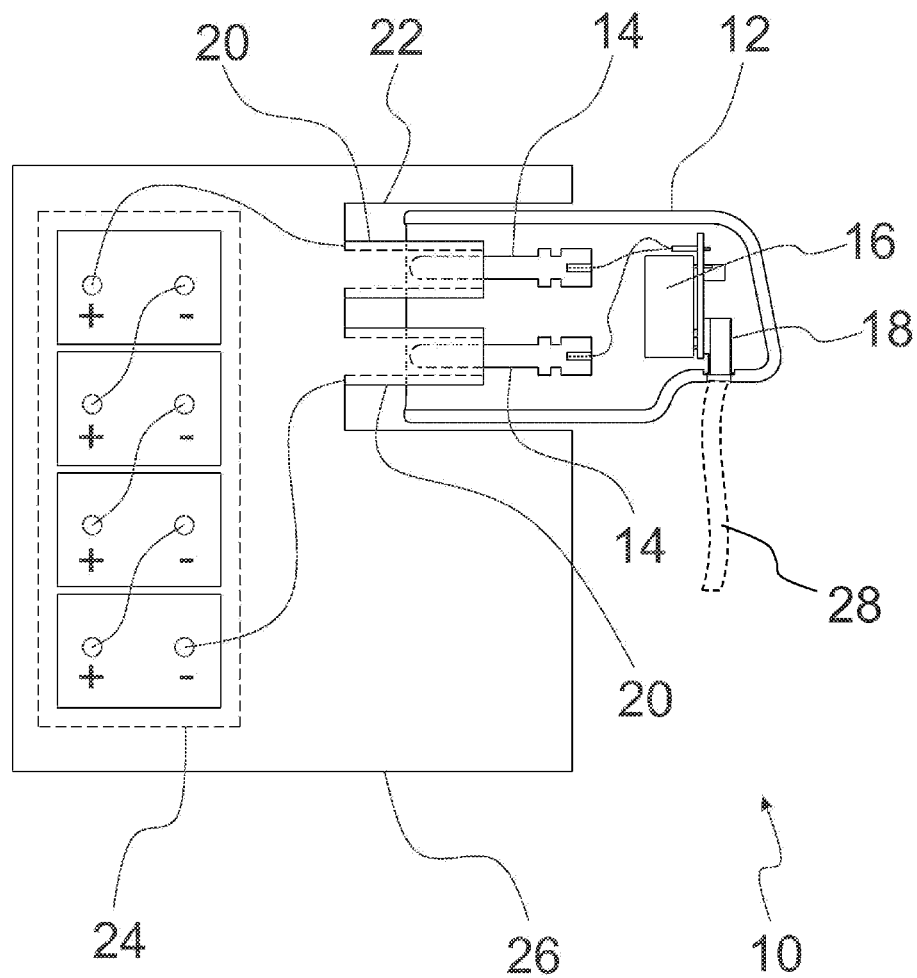
FIG. 1 illustrates a top view of an electric power supply adapter device of the present invention.

The above and other objects, which will be apparent to those skilled in the art, are achieved in the present invention which is directed to a device for sourcing electrical power found at the charging receptacle of an electric utility vehicle for use by an electronic apparatus, comprising a first fitting designed to connect electrically to a charging receptacle of an electric utility vehicle.

The device also includes a DC converter module in electric communication with the first fitting, the DC converter module configured to convert input DC voltage and current to a usable output DC voltage and current.

The device further includes a second fitting in electrical communication with the DC converter module, wherein the second fitting is configured to make an electrical connection with an electronic apparatus.

DETAILED DESCRIPTION

The preferred embodiments are illustrated in the context of sourcing power found at the charging receptacle in an electric golf car or electric utility vehicle. The skilled artisan will readily appreciate, however, that the materials and methods disclosed herein will have application in a number of other contexts where sourcing electric power found at the charging receptacle in an electric golf car or electric utility vehicle is desirable, particularly where no other convenient power source is available.

These and other objects and advantages of the present invention will become more fully apparent from the following description taken in conjunction with the accompanying drawings.

Reference will now be made to the drawings wherein like numerals refer to like parts throughout.

DEFINITIONS

The term, "electric utility vehicle," is used to mean electric vehicles generally intended for off road use that have top speed of less than about 40 mph. Examples include, but are not limited to electric golf cars, electric general utility vehicles such as used by ground services and maintenance departments, electric power mowers, electric lawn care equipment, and small electric tractors. The term, "electric golf car", sometimes called, "electric golf carts," is used to mean electric vehicles generally intended to have a top speed of less than 25 mph and carry golfers and their golf clubs. Specific examples of golf cars include, but are not limited to E-Z-GO™, Club Car™, and Yamaha™.

In one embodiment of the invention, an electric power supply adapter device plugs into a charging receptacle of an electric golf car or electric utility vehicle. According to one aspect of the present invention, the electric power supply adapter device includes input electric connectors adapted to fit a charging receptacle of an electric golf car or electric utility vehicle, a DC (direct current) converter module to convert input DC voltage and current from the charging receptacle of an electric golf car or electric utility vehicle into a desired output DC voltage and current, and an output electric connector adapted to connect to an electronic apparatus and to transmit the DC output power from the DC converter module to the electronic apparatus. Examples of such electronic apparatuses may include, but are not limited to, a mobile phone, smart phone, an iPhone™, an iPad™, a Blackberry™, a SkyCaddie™, audio speakers, GPS units, a tablet, a fan, and a light.

In one embodiment of the invention, as shown in FIG. 1 an electric power supply adapter device 10 is provided. There is a first fitting configured to fit a charging receptacle 22. There is a DC converter module 16 in electric communication with the first fitting. There is a second fitting in electric communication with the DC converter module 16. The first fitting may use, but is not limited to use, prongs, pins, or flexible conductive material to make an electric connection with the electric connectors 20 of the charging receptacle 22 of an electric golf car or electric utility vehicle 26. There is a housing 12, which may be made of plastic, rubber, or exotic materials to fit an individual charging receptacle 22, or may use a universal shape to fit a plurality of charging receptacles. The DC converter module 16 is electrically connected to an output electric connector 18, which may use, but is not limited to use, a USB (universal serial bus) port, multiple USB ports, a cable 28 directly integrated and adapted to interface with the power port of an electronic apparatus, or other electrical connections.

Figure 2:
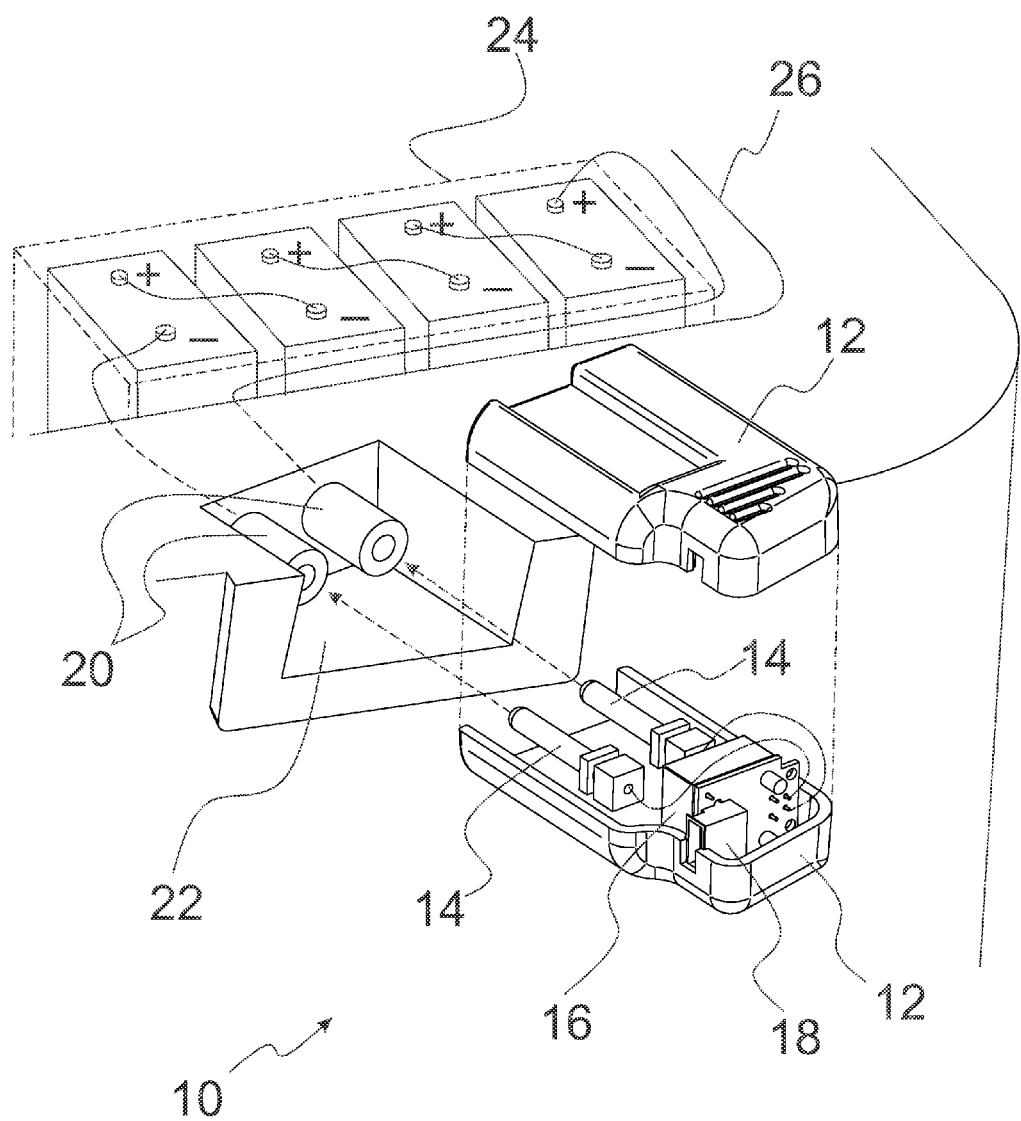
FIG. 2 is an exploded perspective view of an electric power supply adapter device of the present invention.

In an exemplary embodiment, referring now to the invention in more detail, in FIG. 1 and FIG. 2 there is shown an electric power supply adapter device 10 which may have a multiple part housing 12 containing multiple input electric connectors 14, a DC converter module 16, and an output electric connector 18. Each of the input electric connectors 14 is in electric communication with the DC converter module 16 which is in electric communication with the output electric connector 18.

In further detail, still referring to the invention of FIG. 1 and FIG. 2 there is shown the inner cavity of the housing 12 which may contain the circuitry for obtaining power found at the charging receptacle 22 in an electric golf car or electric utility vehicle 26, converting the power to the required voltage and current, and transmitting the power to the electronic apparatus.

In further detail, still referring to the invention of FIG. 1 and FIG. 2, the housing 12 may be designed to align the input electric connectors 14 of the electric power supply adapter device 10 with the electric connectors 20 of the charging receptacle 22 of an electric golf car or electric utility vehicle 26. The electric connectors 20 of the charging receptacle 22 of an electric golf car or electric utility vehicle 26 electrically connect with a plurality of batteries 24 in the electric golf car or electric utility vehicle 26. The input electric connectors 14 of the electric power supply adapter device 10 may have a diameter, length, and distance between them which allow them to plug into the electric connectors 20 of the charging receptacle 22 of an electric golf car or electric utility vehicle 26.

The shapes, dimensions, materials of construction, and arrangements of the parts of the various embodiments of the invention as shown in FIG. 1 and FIG. 2 are not critical except as otherwise noted, and any shapes, dimensions, materials of construction, and arrangements of the parts may be used provided they allow those embodiments to operate and the benefits of this invention to be achieved.

Figure 3:
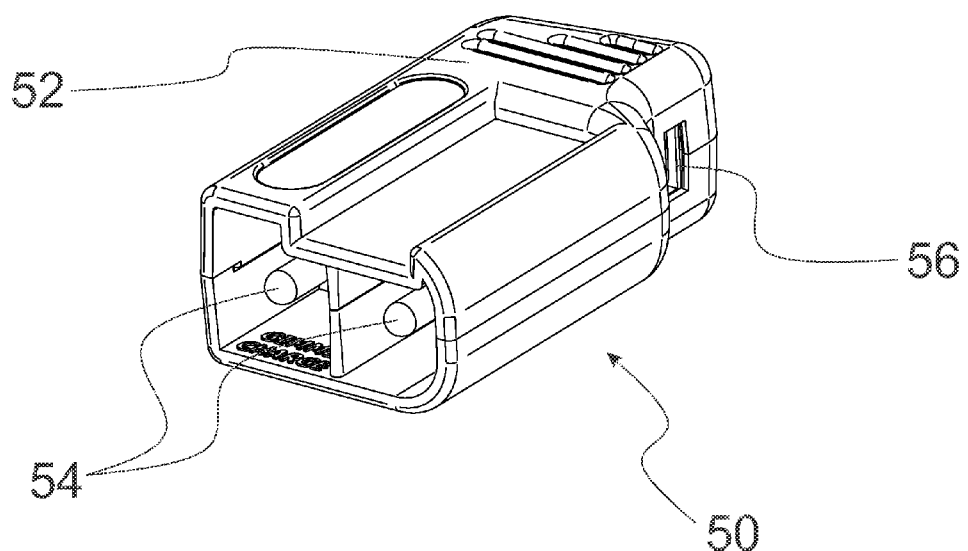
FIG. 3 is a perspective view of an electric power supply adapter device of the present invention.

Referring now to the invention in more detail, FIG. 3 shows the same invention in FIG. 1 and FIG. 2. This view shows a possible configuration of an electric power supply adapter device 50 with the complete housing 52, the multiple input electric connectors 54, and the output electric connector 56.

Figure 4:
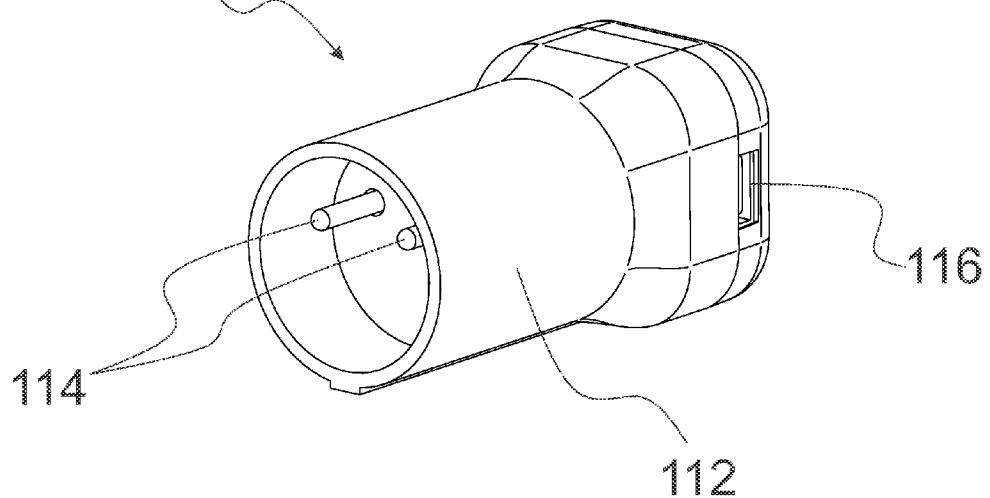
FIG. 4 is a perspective view of an electric power supply adapter device of the present invention.

Referring now to the invention in more detail, FIG. 4 shows another possible configuration of an electric power supply adapter device 110 and is an example of an alternate shape and arrangement of the parts. FIG. 4 shows the electric power supply adapter device 110, the housing 112, input electric connectors 114, and output electric connector 116.

Referring now to the invention in more detail, FIG. 5 shows yet another possible configuration of an electric power supply adapter device 150 and is an example of an alternate shape and arrangement of the parts. FIG. 5 shows the electric power supply adapter device 150, the housing 152, input electric connectors 154, and output electric connector 156.

Referring now to the invention in more detail, FIG. 6 shows yet another possible configuration of an electric power supply adapter device 210 and is an example of an alternate shape and arrangement of the parts. FIG. 6 shows the electric power supply adapter device 210, the housing 212, input electric connectors 214, and output electric connector 216.

Figure 7:
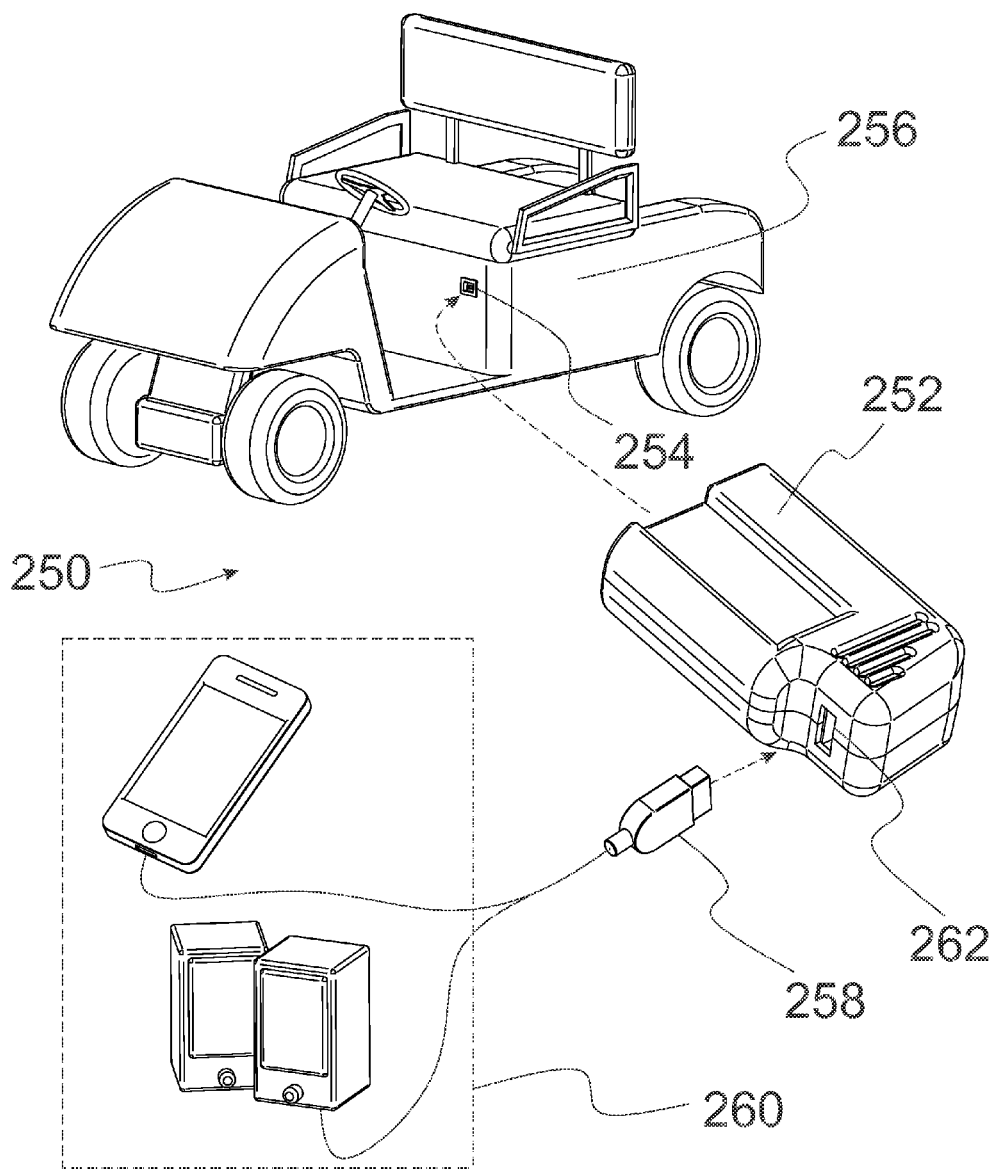
FIG. 7 is a connection diagram of an electric power supply adapter device of the present invention.

Referring now to the invention in more detail, in FIG. 7 there is shown what may be the intended connection diagram 250, which may have an electric power supply adapter device 252, an electric golf car or electric utility vehicle 256, a charging receptacle 254, a connector cable 258, and an electronic apparatus 260.

In further detail, still referring to the invention of FIG. 7 the electric power supply adapter device 252 may be plugged into the charging receptacle 254 of an electric golf car or electric utility vehicle 256. The electronic apparatus 260 may be connected to the output connector 262 of the electric power supply adapter device 252, and may be done through means of a connector cable 258. Thus, the power found at the charging receptacle 254 of an electric golf car or electric utility vehicle 256 provides power to the electronic apparatus 260.

In further detail, still referring to the invention of FIG. 7 the electric power supply adapter device 252 may be positionable in the charging receptacle 254 of an electric golf car or electric utility vehicle 256 such that the electric power supply adapter device 252 may operationally engage the electric connectors within the charging receptacle 254. The connector cable 258 may have one end connected to the output connector 262 of the electric power supply adapter device 252 and may have the other end terminating in an electric connector connectable to a power port of an electronic apparatus 260.

The shapes, dimensions, materials of construction, arrangements of the parts, etc. of the various embodiments of the invention as shown in FIG. 7 are not critical except as otherwise noted, and any shapes, dimensions, materials of construction, arrangements of the parts, etc. may be used provided they allow those embodiments to operate and the benefits of this invention to be achieved.

Referring now to the invention in more detail, in FIG. 8 there is shown a circuit block diagram 310 for showing an electric power supply adapter device 312, according to the present embodiment. The electric power supply adapter device 312 may contain within the housing multiple input electric connectors 314, a DC converter module 316, and an output electric connector 318.

The advantages of the present invention include, without limitation, the ability to allow an electronic apparatus to be powered conveniently from a charging receptacle of an electric golf car or electric utility vehicle. Electric golf cars and electric utility vehicles have charging receptacles that have a shape, electrical connector position, and DC voltage combination unlike any other type of charging receptacle. The present invention conveniently fits into a charging receptacle of an electric golf car or electric utility vehicle, converts the input voltage and current to the required output voltage and current, and outputs the needed power to an electronic apparatus.

In broad embodiment, power found at the charging receptacle of an electric golf car or electric utility vehicle flows through the electric power supply adapter device and to the electronic apparatus.

The exemplary embodiment shown and discussed in FIGS. 1-8 is meant to be illustrative only and is not intended to be limiting in any way.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, methods, and examples, but by all embodiments and methods within the scope and spirit of the invention as claimed.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A device for sourcing electrical power found at the charging receptacle of an electric utility vehicle for use by an electronic apparatus, comprising:
    a first fitting designed to connect electrically to a charging receptacle of an electric utility vehicle;
    a DC converter module in electric communication with the first fitting, the DC converter module configured to convert input DC voltage and current to a usable output DC voltage and current, wherein the input voltage is between about 30 and 50 volts; and
    a second fitting in electrical communication with the DC converter module, wherein the second fitting is configured to make an electrical connection with an electronic apparatus.

2. The device of claim 1 wherein the first fitting is designed to fit an individual charging receptacle of an electric utility vehicle.

3. The device of claim 1 wherein the first fitting is a universal design to fit a plurality of charging receptacles of electric utility vehicles.

4. The device of claim 1 wherein the electric utility vehicle comprises an electric golf car.

5. The device of claim 1 wherein the input current is between about 10 and 210 milliamps.

6. The device of claim 1 wherein the input current is between about 30 and 110 milliamps.

7. The device of claim 1 wherein the output voltage is between about 2 and 10 volts DC.

8. The device of claim 1 wherein the output voltage is between about 4.5 and 5.5 volts DC.

9. The device of claim 1 wherein the output current is between about 0.2 and 2.0 amps.

10. The device of claim 1 wherein the output current is between about 0.3 and 1.0 amps.

11. The device of claim 1 wherein the second fitting comprises a standard USB port.

12. The device of claim 1 wherein the second fitting comprises two standard USB ports.

13. The device of claim 1 wherein the second fitting comprises a cable directly integrated and adapted to interface with an electronic apparatus.

14. A device for sourcing electrical power from a charging receptacle of a golf cart, comprising:
    a first fitting designed to fit the charging receptacle of the golf cart, wherein the first fitting comprises an input electric connector that is capable of being electronically connected to the charging receptacle and inputting a first DC voltage and a first DC current, and the first DC voltage is between about 30 and 50 volts;
    a DC converter module in electric communication with the first fitting, for converting the first DC voltage and the first DC current to a second DC voltage and a second DC current, wherein the second DC voltage is lower than the first DC voltage; and
    a second fitting in electrical communication with the DC converter module, wherein the second fitting comprises an output electric connector that is capable of being electronically connected to an electronic apparatus and outputting the second DC voltage and the second DC current to the electronic apparatus.

15. A device for sourcing electrical power found at the charging receptacle of an electric utility vehicle for use by an electronic apparatus, comprising:
    a first fitting designed to connect electrically to a charging receptacle of an electric utility vehicle;
    a DC converter module in electric communication with the first fitting, the DC converter module configured to convert input DC voltage and current to a usable output DC voltage and current, wherein the input voltage is between about 30 and 100 volts; and
    a second fitting in electrical communication with the DC converter module, wherein the second fitting is configured to make an electrical connection with an electronic apparatus.

* * * * *